(12) United States Patent
Niv et al.

(10) Patent No.: US 6,757,105 B2
(45) Date of Patent: Jun. 29, 2004

(54) OPTICAL DEVICE HAVING A WIDE FIELD-OF-VIEW FOR MULTICOLOR IMAGES

(75) Inventors: Yehuda Niv, Nes Ziona (IL); Uzia Nivon, Moshav Kidron (IL)

(73) Assignee: Planop Planar Optics Ltd., Rehovot (IL)

( * ) Notice: Subject to any disclaimer, the term of this patent is extended or adjusted under 35 U.S.C. 154(b) by 0 days.

(21) Appl. No.: 10/131,262

(22) Filed: Apr. 25, 2002

(65) Prior Publication Data

US 2003/0202247 A1 Oct. 30, 2003

(51) Int. Cl.⁷ .................................................. G02B 5/18
(52) U.S. Cl. ..................... 359/569; 359/566; 359/15; 359/13
(58) Field of Search ..................... 359/569, 558.566, 359/572, 15, 13, 34, 630, 633, 603; 345/7, 8, 9

(56) References Cited

U.S. PATENT DOCUMENTS

| | | | |
|---|---|---|---|
| 4,711,512 A | | 12/1987 | Upatnieks ....................... 345/7 |
| 5,082,629 A | * | 1/1992 | Burgess et al. .......... 422/82.11 |
| 5,682,255 A | * | 10/1997 | Friesem et al. ................ 359/15 |
| 5,966,223 A | | 10/1999 | Friesem et al. ................ 359/16 |
| 6,580,529 B1 | * | 6/2003 | Amitai et al. .................. 359/13 |
| 6,611,385 B2 | * | 8/2003 | Song .......................... 359/630 |

FOREIGN PATENT DOCUMENTS

JP             06250022 A  *  9/1994    ............ G02B/5/32

* cited by examiner

*Primary Examiner*—Audrey Chang
*Assistant Examiner*—Aynel C. Lavarias
(74) *Attorney, Agent, or Firm*—G.E. Ehrlich (1995) Ltd.

(57) ABSTRACT

A diffractive optical element for guiding a light having a color spectrum characterized by a plurality of wavelengths longer than a shortest wavelength, $\lambda_B$, and shorter than a longest wavelength, $\lambda_R$, the light striking the diffractive optical element at an angle greater than a first field-of-view angle, $\alpha^-_{FOV}$, and smaller than a second field-of-view angle, $\alpha^+_{FOV}$. The diffractive optical element comprising a linear grating being formed in a light-transmissive substrate. The linear grating is characterized by a pitch, d, selected so as to allow total internal reflection of a light having wavelength of $\lambda_B$ and a striking angle of $\alpha^-_{FOV}$. The light-transmissive substrate is characterized by an index of refraction, $n_s$, larger than a minimal index of refraction, $n_{MIN}$, which is selected so as to allow total internal reflection of a light having wavelength of $\lambda_R$ and a striking angle of $\alpha^+_{FOV}$.

112 Claims, 4 Drawing Sheets

OPTICAL DEVICE HAVING A WIDE FIELD-OF-VIEW FOR MULTICOLOR IMAGES

FIELD AND BACKGROUND OF THE INVENTION

The present invention relates to an optical device and, more particularly, to an optical device having a wide field-of-view and which is capable of providing multicolor images.

Miniaturization of electronic devices has always been a continuing objective in the field of electronics. Electronic devices are often equipped with some form of a display, which is visible to a user. As these devices reduce in size, there is an increase need for manufacturing compact displays, which are compatible with small size electronic devices. Besides having small dimensions, such displays should not sacrifice image quality, and be available at low cost. By definition the above characteristics are conflicting and many attempts have been made to provide some balanced solution.

An electronic display may provide a real image, the size of which is determined by the physical size of the display device, or a virtual image, the size of which may extend the dimensions of the display device.

A real image is defined as an image, projected on or displayed by a viewing surface positioned at the location of the image, and observed by an unaided human eye. Examples of real image displays include a cathode ray tube (CRT), a liquid crystal display (LCD), or an organic light emitting diode array (OLED). Typically, desktop computer systems and workplace computing equipment utilize CRT display screens to display images for a user. The CRT displays are heavy, bulky, and not easily miniaturized. For a laptop, a notebook, or a palm computer, flat-panel display is typically used. The flat-panel display may use LCD technology implemented as passive matrix or active matrix panel. The passive matrix LCD panel consists of a grid of horizontal and vertical wires. Each intersection of the grid constitutes a single pixel, and is controlled by a LCD element. The LCD element either allows light through or blocks the light. The active matrix panel uses a transistor to control each pixel, and is more expensive.

An OLED flat panel display is an array of light emitting diodes, made of organic polymeric materials. Existing OLED flat panel displays are based on both passive and active configurations. Unlike the LCD display, which controls light transmission or reflection, an OLED display emits light, the intensity of which is controlled by the electrical bias applied thereto.

The flat-panels are also used for miniature image display systems because of their compactness and energy efficiency compared to the CRT displays. Small size real image displays have a relatively small surface area on which to present a real image, thus have limited capability for providing sufficient information to the user. In other words, because of the limited resolution of the human eye, the amount of details resolved from a small size real image might be insufficient.

By contrast to a real image, a virtual image is defined as an image, which is not projected onto a viewing surface, and no light ray connects the image and an observer. A virtual image can only be seen through an optic element, for example a typical virtual image can be obtained from an object placed in front of a converging lens, between the lens and its focal point. Light rays, which are reflected from an individual point on the object, diverge when passing through the lens, thus no two rays share two endpoints. An observer, viewing from the other side of the lens would perceive an image, which is located behind the object, hence enlarged. A virtual image of an object, positioned at the focal plane of a lens, is said to be projected to infinity.

Conventional virtual image displays are known to have many shortcomings. For example, such displays have suffered from being too heavy for comfortable use, as well as too large so as to be obtrusive, distracting, and even disorienting. These defects stem from, among other things, the incorporation of relatively large optics systems within the mounting structures, as well as physical designs which fail to adequately take into account important factors as size, shape, weight, etc.

Recently, holographic optical elements have been used in portable virtual image displays. Holographic optical elements serve as an imaging lens and a combiner where a two-dimensional, quasi-monochromatic display is imaged to infinity and reflected into the eye of an observer. A common problem to all types of holographic optical elements is their relatively high chromatic dispersion. This is a major drawback in applications where the light source is not purely monochromatic. Another drawback of some of these displays is the lack of coherence between the geometry of the image and the geometry of the holographic optical element, which causes aberrations in the image array that decrease the image quality.

New designs, which typically deal with a single holographic optical element, compensate for the geometric and chromatic aberrations by using non-spherical waves rather than simple spherical waves for recording; however, they do not overcome the chromatic dispersion problem. Moreover, with these designs, the overall optical systems are usually very complicated and difficult to manufacture. Furthermore, the field-of-view resulting from these designs is usually very small.

U.S. Pat. No. 4,711,512 to Upatnieks, the contents of which are hereby incorporated by reference, discloses a head-up display based on planar optics technique, by the use of relatively thick volume holograms. Collimated light wavefronts of an image enter a glass plate, located in an aircraft cockpit between the pilot and the aircraft windscreen, through an input diffraction grating element, are transmitted through the glass plate by total internal reflection and are coupled out in a direction of an eye of a pilot, by means of another diffractive element.

One ordinarily skilled in the art would appreciate that although thick volume holograms provide high diffraction efficiency, the maximal field-of-view which may be obtained, as well as the multicolor bandwidth of the images is substantially narrow.

U.S. Pat. No. 5,966,223 to Friesem et. al., the contents of which are hereby incorporated by reference, discloses a holographic optical device similar to that of Upatnieks, with the additional aspect that the first diffractive optical element acts further as the collimating element that collimates the waves emitted by each data point in a display source and corrects for field aberrations over the entire field-of-view. Indeed, according to Friesem et. al., the obtained field-of-view is ±6°, which improves on the Upatnieks' device. However, the diffractive collimating element is known to narrow spectral response, and although Friesem et. al. observed low chromatic sensitivity over wavelength shift of ±2 nm around a 632.8 nm wavelength, chromatic aberrations would be rather considerable at spectral ranges of ±20 nm or ±70 nm.

There is thus a widely recognized need for, and it would be highly advantageous to have, an optical device capable of providing a wide field-of-view of multicolor images devoid of the above limitations.

SUMMARY OF THE INVENTION

According to one aspect of the present invention there is provided a diffractive optical element for optimizing a field-of-view for a multicolor spectrum, comprising a linear grating being formed in a light-transmissive substrate, wherein: (a) the linear grating is characterized by a pitch, d, selected so as to allow total internal reflection of at least a first portion of a light striking the diffractive optical element at a first field-of-view angle, $\alpha^-_{FOV}$, the first portion having a shortest wavelength of the spectrum, $\lambda_B$; and (b) the light-transmissive substrate is characterized by an index of refraction, $n_s$, larger than a minimal index of refraction, $n_{MIN}$, the minimal index of refraction is selected so as to allow total internal reflection of at least a second portion of the light striking the diffractive optical element at a second field-of-view angle, $\alpha^+_{FOV}$, the second portion having a longest wavelength of the spectrum, $\lambda_R$.

According to another aspect of the present invention there is provided a diffractive optical element for guiding a light having a color spectrum characterized by a plurality of wavelengths longer than a shortest wavelength, $\lambda_B$, and shorter than a longest wavelength $\lambda_R$, the light striking the diffractive optical element at an angle greater than a first field-of-view angle, $\alpha^-_{FOV}$, and smaller than a second field-of-view angle, $\alpha^+_{FOV}$, the diffractive optical element comprising a linear grating being formed in a light-transmissive substrate, wherein: (a) the linear grating is characterized by a pitch, d, selected so as to allow total internal reflection of a light having wavelength of $\lambda_B$ and a striking angle of $\alpha^-_{FOV}$; and (b) the light-transmissive substrate is characterized by an index of refraction, $n_s$, larger than a minimal index of refraction, $n_{MIN}$, the minimal index of refraction is selected so as to allow total internal reflection of a light having wavelength of $\lambda_R$ and a striking angle of $\alpha^+_{FOV}$.

According to yet another aspect of the present invention there is provided an optical device having a wide field-of-view for a multicolor spectrum, the optical device comprising a first diffractive optical element being formed in a light-transmissive substrate, and a second diffractive optical element, laterally displaced from the first diffractive optical element, and being formed in the light-transmissive substrate, wherein: (a) the first and the second diffractive optical elements are linear grating characterized by a pitch, d, which is selected so as to allow total internal reflection of at least a first portion of a light striking the diffractive optical element at a first field-of-view angle, $\alpha^-_{FOV}$, the first portion having a shortest wavelength of the spectrum, $\lambda_B$; and (b) the light-transmissive substrate is characterized by an index of refraction, $n_s$, larger than a minimal index of refraction, $n_{MIN}$, the minimal index of refraction is selected so as to allow total internal reflection of at least a second portion of the light striking the diffractive optical element at a second field-of-view angle, $\alpha^+_{FOV}$, the second portion having a longest wavelength of the spectrum, $\lambda_R$.

According to still another aspect of the present invention there is provided an optical device for transmitting a light having a color spectrum characterized by a plurality of wavelengths longer than a shortest wavelength, $\lambda_B$, and shorter than a longest wavelength $\lambda_R$, the light striking the optical device at an angle greater than a first field-of-view angle, $\alpha^-_{FOV}$, and smaller than a second field-of-view angle, $\alpha^+_{FOV}$, the optical device comprising a first diffractive optical element being formed in a light-transmissive substrate, and a second diffractive optical element, laterally displaced from the first diffractive optical element, and being formed in the light-transmissive substrate, wherein: (a) the first and the second diffractive optical elements are linear grating is characterized by a pitch, d, selected so as to allow total internal reflection of a light having wavelength of $\lambda_B$ and a striking angle of $\alpha^-_{FOV}$; and (b) the light-transmissive substrate is characterized by an index of refraction, $n_s$, larger than a minimal index of refraction, $n_{MIN}$, the minimal index of refraction is selected so as to allow total internal reflection of a light having wavelength of $\lambda_R$ and a striking angle of $\alpha^+_{FOV}$.

According to further features in preferred embodiments of the invention described below, the minimal index of refraction is larger than $\lambda_R/d + n_A \sin(\alpha^+_{FOV})$.

According to still further features in the described preferred embodiments the optical device further comprising an input light source for producing the light.

According to still further features in the described preferred embodiments the optical device further comprising a collimator for collimating the light produced by the input light source.

According to still further features in the described preferred embodiments the optical device further comprising at least one optical element for redirecting light rays, positioned so as to reduce an overall size of the optical device.

According to an additional aspect of the present invention there is provided a method of manufacturing a diffractive optical element for optimizing a field-of-view for a multicolor spectrum, the method comprising: (a) determining a linear grating pitch, d, so as to allow total internal reflection of at least a first portion of a light striking the diffractive optical element at a first field-of-view angle, $\alpha^-_{FOV}$, the first portion having a shortest wavelength of the spectrum, $\lambda_B$; (b) determining a minimal index of refraction, $n_{MIN}$, so as to allow total internal reflection of at least a second portion of the light striking the diffractive optical element at a second field-of-view angle, $\lambda^+_{FOV}$, the second portion having a longest wavelength of the spectrum, $\lambda_R$; and (c) forming a linear grating characterized by the grating pitch, d, in a light-transmissive substrate characterized by an index of refraction, $n_s$, wherein the n being larger than the $n_{MIN}$.

According to yet an additional aspect of the present invention there is provided a method of manufacturing a diffractive optical element for guiding a light having a color spectrum characterized by a plurality of wavelengths longer than a shortest wavelength, $\lambda_B$, and shorter than a longest wavelength $\lambda_R$, the light striking the diffractive optical element at an angle greater than a first field-of-view angle, $\alpha^-_{FOV}$, and smaller than a second field-of-view angle, $\alpha^{+FOV}$, the method comprising: (a) determining a linear grating pitch, d, so as to allow total internal reflection of a light having wavelength of $\lambda_B$ and a striking angle of $\alpha^-_{FOV}$; (b) determining a minimal index of refraction, $n_{MIN}$, so as to allow total internal reflection of a light having wavelength of $\lambda_R$ and a striking angle of $\alpha^+_{FOV}$; and (c) forming a linear grating characterized by the grating pitch, d, in a light-transmissive substrate characterized by an index of refraction, $n_s$, which is larger than $n_{MIN}$.

According to still an additional aspect of the present invention there is provided a method of manufacturing an optical device having a wide field-of-view for a multicolor spectrum, the method comprising: (a) determining a linear grating pitch, d, so as to allow total internal reflection of at least a first portion of a light striking the diffractive optical element at a first field-of-view angle, $\alpha^-_{FOV}$, the first portion having a shortest wavelength of the spectrum, $\lambda_B$; (b) determining a minimal index of refraction, $n_{MIN}$, so as to allow total internal reflection of at least a second portion of the light striking the diffractive optical element at a second field-of-view angle, $\alpha^+_{FOV}$, the second portion having a longest wavelength of the spectrum, $\lambda_R$; and (c) positioning a light-transmissive substrate and forming therein a first diffractive optical element and a second diffractive optical element laterally displaced from the first diffractive optical element; wherein the first and the second diffractive optical elements are linear gratings characterized by the grating pitch, d, and the light-transmissive substrate is characterized by an index of refraction, $n_s$, which is larger than $n_{MIN}$.

According to a further aspect of the present invention there is provided a method of manufacturing an optical device for transmitting a light having a color spectrum characterized by a plurality of wavelengths longer than a shortest wavelength, $\lambda_B$, and shorter than a longest wavelength $\lambda_R$, the light striking the optical device at an angle greater than a first field-of-view angle, $\alpha^-_{FOV}$, and smaller than a second field-of-view angle, $\alpha^+_{FOV}$, the method comprising: (a) determining a linear grating pitch, d, so as to allow total internal reflection of a light having wavelength of $\lambda_B$ and a striking angle of $\alpha^-_{FOV}$; (b) determining a minimal index of refraction, $n_{MIN}$, so as to allow total internal reflection of a light having wavelength of $\lambda_R$ and a striking angle of $\alpha^+_{FOV}$; and (c) positioning a light-transmissive substrate and forming therein a first diffractive optical element and a second diffractive optical element laterally displaced from the first diffractive optical element; wherein the first and the second diffractive optical elements are linear grating characterized by the grating pitch, d, and the light-transmissive substrate is characterized by an index of refraction, $n_s$, which is larger than the $n_{MIN}$.

According to further features in preferred embodiments of the invention described below, $\lambda_R$ is larger than $\lambda_B$ by at least 30 nm.

According to still further features in the described preferred embodiments, grating pitch, d, is selected so that a ratio between $\lambda_B$ and d has an average value of about 1.5.

According to still further features in the described preferred embodiments, determining the linear grating pitch, d, is by setting a ratio between $\lambda_B$ and d equal to an oscillating function of the first field-of-view angle, $\alpha^-_{FOV}$.

According to still further features in the described preferred embodiments the oscillating function has an average value of about 1.5.

According to still further features in the described preferred embodiments the oscillating function has a value ranging from 1 to 2.

According to still further features in the described preferred embodiments the oscillating function equals $n_A(1-\sin \alpha^-_{FOV})$, where $n_A$ is an index of refraction of an external medium.

According to still further features in the described preferred embodiments the grating pitch is smaller than or equals $\lambda_B/n_A(1-\sin \alpha^-_{FOV})$.

According to still further features in the described preferred embodiments the index of refraction of the external medium is substantially a unity.

According to still further features in the described preferred embodiments the external medium is air.

According to still further features in the described preferred embodiments determining the minimal index of refraction, $n_{MIN}$, is done so that $n_{MIN}$ is larger than $\lambda_R/d+n_A \sin(\alpha^+_{FOV})$.

According to still further features in the described preferred embodiments the method further comprising selecting a maximal diffraction angle, $\alpha_D^{MAX}$.

According to still further features in the described preferred embodiments the total internal reflection is characterized by the maximal diffraction angle, $\alpha_D^{MAX}$.

According to still further features in the described preferred embodiments $\alpha_D^{MAX}$ is smaller than 90 degrees with respect to an orientation which is perpendicular to the light-transmissive substrate.

According to still further features in the described preferred embodiments selecting a maximal diffraction angle is by calculating an angle corresponding to at least one reflection within a predetermined distance, x.

According to still further features in the described preferred embodiments the predetermined distance x is 30 mm to 80 mm.

According to still further features in the described preferred embodiments the predetermined distance is defined between a center of the first diffractive optical element and a center of the second diffractive optical element.

According to still further features in the described preferred embodiments determining the minimal index of refraction, $n_{MIN}$, is done so that $n_{MIN}$ equals $[\lambda_R/d+n_A \sin(\alpha^+_{FOV})]/\sin(\alpha_D^{MAX})$.

According to still further features in the described preferred embodiments $\alpha^-_{FOV}$ and $\alpha^+_{FOV}$ each independently has an absolute value above 6 degrees with respect to an orientation which is perpendicular to the light-transmissive substrate.

According to still further features in the described preferred embodiments $\lambda_B$ is between about 400 to about 500 nm.

According to still further features in the described preferred embodiments $\lambda_R$ is between about 600 to about 700 nm.

According to still further features in the described preferred embodiments $n_{MIN}$ is between about 1.6 to about 2.0.

According to still further features in the described preferred embodiments d is between about $0.5\lambda_B$ to about $0.99\lambda_B$.

According to still further features in the described preferred embodiments $\lambda_B$ corresponds to a blue light and $\lambda_R$ corresponds to a red light.

According to still further features in the described preferred embodiments $\lambda_B$ corresponds to a blue light, $\lambda_R$ corresponds to a red light, $\alpha^-_{FOV}$ is below about −5 degrees and $\alpha^+_{FOV}$ is above about 5 degrees, where the degrees are with respect to an orientation which is perpendicular to the light-transmissive substrate.

According to still further features in the described preferred embodiments the light-transmissive substrate is of thickness ranging between about 0.5 mm and about 5 mm.

According to still further features in the described preferred embodiments the light-transmissive substrate is selected from the group consisting of glass and a transparent polymer.

According to still further features in the described preferred embodiments the linear diffraction grating of the first and second diffractive optical elements are each independently selected from the group consisting of reflection linear diffraction grating and transmission linear diffraction grating.

According to still further features in the described preferred embodiments the linear diffraction gratings of the first and the second diffractive optical elements are each independently formed on a surface selected from the group consisting of a first surface of the light-transmissive substrate and a second surface of the light-transmissive substrate.

According to still further features in the described preferred embodiments the method further comprising positioning an input light source for producing the light.

According to still further features in the described preferred embodiments the input light source comprises an input display source, hence the light constitutes an image.

According to still further features in the described preferred embodiments the method further comprising positioning a collimator for collimating the light produced by the input light source.

According to still further features in the described preferred embodiments the collimator comprises a converging lens.

According to still further features in the described preferred embodiments the collimator comprises a diffractive optical element.

According to still further features in the described preferred embodiments the method further comprising positioning at least one optical element for redirecting light rays, positioned so as to reduce an overall size of the optical device.

According to still further features in the described preferred embodiments the at least one optical element is a 45 degrees mirror.

According to still further features in the described preferred embodiments the linear diffraction gratings are recorded by a procedure selected from a group consisting of holography, computer-generated masks, lithography, embossing, etching and direct writing.

The present invention successfully addresses the shortcomings of the presently known configurations by providing a diffractive optical element, an optical device incorporating the optical element and methods of manufacturing and using same. The optical element enjoys properties far exceeding those characterizing prior art optical elements.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
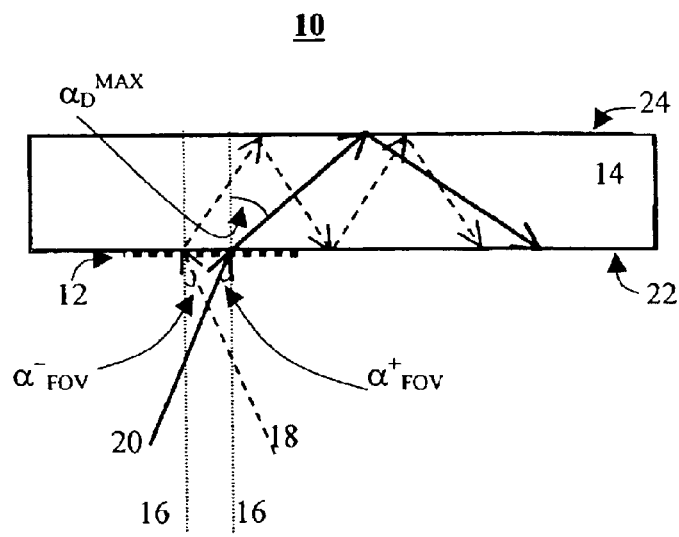
FIG. 1a is a side view of an optical element, according to the present invention.

The present invention is of a diffractive optical element which can be used to optimize a field-of-view of a multicolor spectrum. The present invention is further of an optical device incorporating the optical elements and of methods of manufacturing and using same. Specifically, the present invention can be used to optimize a field-of-view in optical devices having a multicolor display, e.g., cellular telephones, personal digital assistants, head mounted displays, head-up displays, aircraft cockpits and the like.

The principles and operation of a diffractive optical element, optical device and methods according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

When a ray of light moving within a light-transmissive substrate and striking one of its internal surfaces at an angle $\alpha_1$ as measured from a normal to the surface, it can be either reflected from the surface or refracted out of the surface into the open air in contact with the substrate. The condition according to which the light is reflected or refracted is determined by Snell's law, which is mathematically realized through the following equation:

$$n_A \sin \alpha_2 = n_s \sin \alpha_1, \qquad \text{(Eq. 1)}$$

where $n_s$ is the index of refraction of the light-transmissive substrate, $n_A$ is the index of refraction of the medium outside the light transmissive substrate ($n_s > n_A$), and $\alpha_2$ is the angle in which the ray is refracted out, in case of refraction. Similarly to $\alpha_1$, $\alpha_2$ is measured from a normal to the surface. A typical medium outside the light transmissive substrate is air having an index of refraction of about unity.

As used herein, the term "about" refers to ±10%.

As a general rule, the index of refraction of any substrate depends on the specific wavelength $\lambda$ of the light which strikes its surface. Given the impact angle, $\alpha_1$, and the refraction indices, $n_s$ and $n_A$, Equation 1 has a solution for $\alpha_2$ only for $\alpha_1$ which is smaller than arcsine of $n_A/n_s$ often called the critical angle. Hence, for sufficiently large $\alpha_1$ (above the critical angle), no refraction angle $\alpha_2$ satisfies Equation 1 and light energy is trapped within the light-transmissive substrate. In other words, the light is reflected from the internal surface as if it had stroked a mirror. Under these conditions, total internal reflection is said to take place. Since different wavelengths of light (i.e., light of different colors) correspond to different indices of refraction, the condition for total internal reflection, depends not only on the angle at which the light strikes the substrate, but also on the wavelength of the light. In other words, an angle which satisfies the total internal reflection condition for one wavelength may not satisfy this condition for a different wavelength.

In planar optics there is a variety of optical elements which are designed to provide an appropriate condition of total internal reflection so that a light will be transmitted within a light transmissive substrate over a predetermined optical distance. Typically, such optical elements are manufactured as a linear grating which are located on one surface of a light-transmissive substrate at or opposite to the entry point of the light rays. A linear grating is characterized by a so-called grating period or grating pitch, d, which is directly related to the wavelength, $\lambda$, of the light and to the angles $\alpha_I$ and $\alpha_D$, at which a ray of the light incident the light-transmissive substrate and diffracted inwards, respectively. The relation is given by the following equation:

$$n_s \sin \alpha_D - n_A \sin \alpha_I = \lambda/d. \quad \text{(Eq. 2)}$$

According the known conventions, the sign of $\alpha_I$ and $\alpha_D$ is positive, if the angles are measured clockwise from the normal to the surface, and negative otherwise.

The available range of incident angles is often referred to in the literature as a "field-of-view". The wide spectrum of wavelengths of the visible light and the relatively sensitive dependence of the total internal reflection condition on both angle and wavelength make the known optical elements suitable only for monochromatic light and small angles.

According to the present invention, there is provided a diffractive optical element for optimizing a field-of-view for a multicolor spectrum, which optical element is generally referred to herein as optical element 10.

Figure 1B:
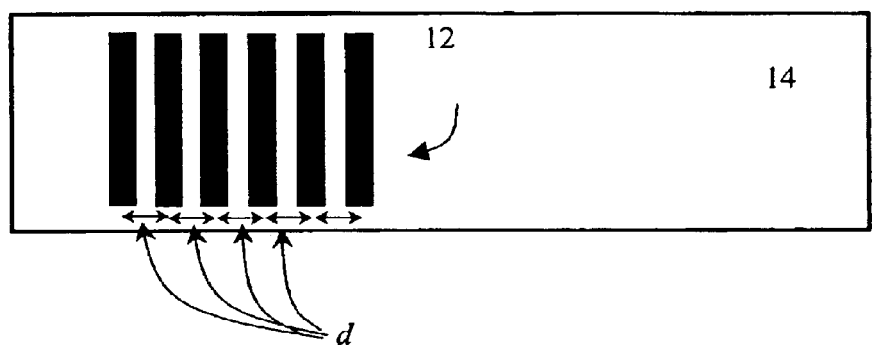
FIG. 1b is a bottom view of the optical element, according to the present invention.

Referring now to the drawings, FIGS. 1a–b illustrate a side view and a bottom view of optical element 10, respectively. Optical element 10 includes linear grating 12 being formed in a light-transmissive substrate 14, having a first surface 22 and a second surface 24. Linear grating 12 is characterized by a pitch, d, selected so as to allow total internal reflection of at least a first portion of a light striking the diffractive optical element at a first field-of-view angle, $\alpha^-_{FOV}$. As can be understood from the superscript "–", $\alpha^-_{FOV}$ is preferably measured anticlockwise from a normal 16 to surface 22 of light-transmissive substrate 14, hence having a negative value. $\alpha^-_{FOV}$ is illustrated in FIG. 1a as an angle between ray 18 and normal 16. It is appreciated that this sign convention cannot be considered as limiting, and that one ordinarily skilled in the art can easily practice the present invention employing an alternative convention.

For a multicolor spectrum, the light rays arriving to optical element 10, including ray 18, have a plurality of wavelengths $\lambda$, from a shortest wavelength, $\lambda_B$, to a longest wavelength, $\lambda_R$. The first portion of the light is preferably the shortest wavelength portion of ray 18.

In the preferred embodiment in which surfaces 22 and 24 are substantially parallel, the grating pitch, d, is determined only by the shortest wavelength of the spectrum and the first field-of-view angle, $\alpha^-_{FOV}$, and it does not depend on other parameters, e.g., the index of refraction of light-transmissive substrate 14 or any wavelength $\lambda$ longer than $\lambda_B$. According to a preferred embodiment of the present invention, the grating pitch, d, is selected so that a ratio between $\lambda_B$ and d is an oscillating function of $\alpha^-_{FOV}$. In one embodiment, the oscillating function has a value which may vary from 1 to 2 and an average value of about 1.5. A preferred expression for the grating pitch, d, is given by the following equation:

$$d = \lambda_B/[n_A(1 - \sin \alpha^-_{FOV})]. \quad \text{(Eq. 3)}$$

It is appreciated that the grating pitch, d, as given by Equation 3, is a maximal grating pitch. Hence, in order to accomplish total internal reflection of all rays having a wavelength equal to or longer than $\lambda_B$ and angle of incidence equal to or larger (more positive) than $\alpha^-_{FOV}$ within light transmissive substrate 14, the grating pitch, d, should be equal to or smaller than $\lambda_B/[n_A(1 - \sin \alpha^-_{FOV})]$.

Light-transmissive substrate 14, characterized by an index of refraction, $n_s$, is chosen so as to allow total internal reflection of at least a second portion of light striking the diffractive optical element at a second field-of-view angle, $\alpha^+_{FOV}$. Unlike the first field-of-view angle, $\alpha^+_{FOV}$ is preferably measured clockwise from normal 16 to the surface of light-transmissive substrate 14. $\alpha^+_{FOV}$ is illustrated in FIG. 1a as an angle between ray 20 and normal 16. The second portion of the light is preferably the longest wavelength portion of ray 20.

Optical element 10 is capable of providing total internal reflection of light having a field of view from $\alpha^-_{FOV}$ to $\alpha^+_{FOV}$ and to a spectrum of wavelengths from $\lambda_B$ to $\lambda_R$, which arrives to light-transmissive substrate 14 from any medium characterized by an index of refraction $n_A$ smaller than the index of refraction $n_s$ of light-transmissive substrate 14.

In order to select light-transmissive substrate 14, it is convenient to define a minimal index of refraction, $n_{MIN}$, so that all substrates having a refraction index which is larger than $n_{MIN}$, are suitable for trapping the light therein. Preferably, $n_{MIN}$ (and consequently the index of refraction $n_s$ of light-transmissive substrate 14) should be larger than $\lambda_R/d + n_A \sin(\alpha^+_{FOV})$. A skilled artisan would appreciate that $n_{MIN}$ may depend also on diffraction angles of the light, once entering light-transmissive substrate 14.

Referring again to FIG. 1a, each ray entering light-transmissive substrate 14 experiences different diffraction angle. According to a preferred embodiment of the present invention it is sufficient to determine $n_{MIN}$ by that largest diffraction angle $\alpha_D^{MAX}$, defined between diffracted ray 20 (i.e., after entering light-transmissive substrate 14) and normal 16.

Hence, as detailed herein and illustrated in FIG. 1a, ray 20 is the "leftmost" ray of light with respect to normal 16, striking light-transmissive substrate 14 at second field-of-view angle $\alpha^+_{FOV}$ and diffracted inwards at largest diffraction angle $\alpha_D^{MAX}$.

According to a preferred embodiment of the present invention, the minimal index of refraction, $n_{MIN}$, satisfies the following equation:

$$n_{MIN} = (\lambda_R/d - n_A \sin \alpha^+_{FOV})/\sin \alpha^{MAX}_D. \quad \text{(Eq. 4)}$$

Once $n_{MIN}$ is calculated from Equation 4, an appropriate light-transmissive substrate can be selected with a sole restriction that its refraction index $n_s$, is larger than $n_{MIN}$. There are four parameters in the left-hand-side of Equation 4, three of which ($\lambda_R$, d and $\alpha^+_{FOV}$) are dictated by the requirements of a device, system or any other application for which optical element 10, is designed. Specifically, $\lambda_R$ is determined from the spectrum of incident light, $\alpha^+_{FOV}$ is determined by the desired field of view of the application and d is determined by both the spectrum and the desired field of view, as detailed hereinabove.

In order to calculate $n_{MIN}$ one needs to explicitly determine $\alpha_D^{MAX}$. It is to be understood that there are no theoretical limitations on $\alpha_D^{MAX}$ except from a requirement that it represents a diffractive angle measured clockwise from normal 16, i.e., $\alpha_D^{MAX}$ should be positive and smaller than 90 degrees. In some cases in the industry, it often happens that the refraction index of light-transmissive substrate 14 is already known (for example when optical element 10 is intended to operate synchronically with a given device which includes a specific light-transmissive substrate). In these cases Equation 4 may be inverted to obtain the largest diffraction angle which is possible.

On the other hand, $\alpha_D^{MAX}$ may be selected according to any practical considerations, such as manufacturing cost, or geometrical limitations which may be imposed by a certain miniaturization necessity.

Hence, in one embodiment, further referred to herein as the "at least one hop" embodiment, $\alpha_D^{MAX}$ is selected so as to allow at least one reflection within a predetermined distance x which may vary from about 30 mm to about 80 mm.

For example, if a thickness of light-transmissive substrate 14 is 2 mm and x=55 mm, a single total internal reflection event within distance x, corresponds to $\alpha_D^{MAX}$ being equal to 85.8 degrees. In another embodiment, further referred to herein as the "flat" embodiment, $\alpha_D^{MAX}$ is selected so as to reduce the number of reflection events within light-transmissive substrate 14, i.e., by imposing a requirement that all the diffraction angles will be sufficiently small, say, below 80 degrees.

Referring still to FIG. 1*a*, linear grating 12 is formed on surface 22 from which the light arrives, hence linear grating 12 operates in a transmission mode, ensuring that all the light rays transmitted through linear grating 12 eventually experience total internal reflection.

According to a preferred embodiment of the present invention, linear grating 12 may also be formed on a second surface 24 of light-transmissive substrate 14, being opposite to surface 22, thereby to operate in a reflection mode, ensuring total internal reflection of all the light rays which are reflected from linear grating 12. In this case, all the principles and operations described hereinabove remain unchanged.

The use of optical element 10 allows incorporating a relatively wide spectrum of wavelengths with a relatively flexible field-of-view. Optical element 10 may be embedded in any device which exploits the total internal reflection phenomenon.

The present invention successfully provides an optical device having a wide field-of-view for a multicolor spectrum, referred to herein as device 30.

Figure 2A:
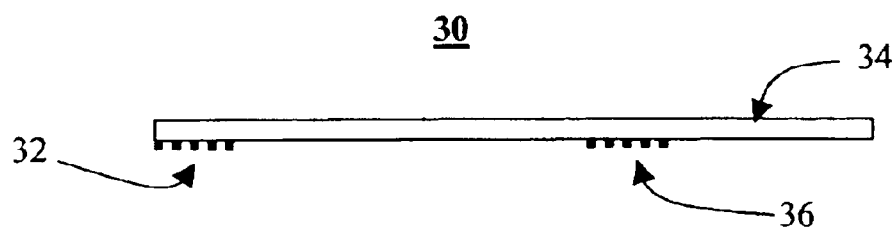
FIG. 2a is a side view of an optical device, according to the present invention.
Figure 2B:
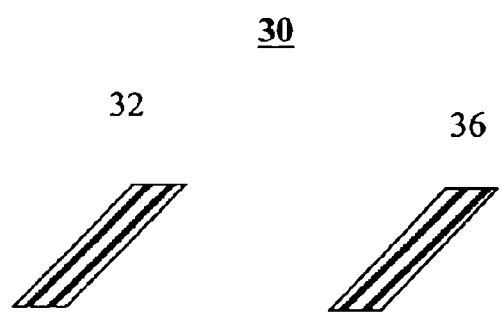
FIG. 2b is an isometric view of the optical device, according to the present invention.

Reference is now made to FIGS. 2*a*–*b*, illustrating device 30 in a side view and an isometric view, respectively. Device 30 includes a first diffractive optical element 32 being formed in a light-transmissive substrate 34. Device 30 further includes a second diffractive optical element 36, laterally displaced from first diffractive optical element 32, and being formed in light-transmissive substrate 34. According to a preferred embodiment of the present invention both first 32 and second 36 diffractive optical elements are linear gratings which are designed similarly to the grating of optical element 10. Likewise, the characteristics of light-transmissive substrate 34 are preferably similar to the characteristics of light-transmissive substrate 14.

As in the case of optical element 10, the diffraction gratings of first 32 and second 36 optical elements, which may be used in any of the preferred embodiments of the invention described herein, may be formed on either surfaces of light-transmissive substrate 34. That is to say that both optical elements may operate in any combination of a reflection mode and a transmission mode.

In use, optical element 32 is illuminated by light, which may be generated by a light source located in front of optical element 32. The illuminating light is diffracted off optical element 32 in a manner such that the light is trapped inside light-transmissive substrate 34 and propagates therethrough, in a direction of optical element 36, by substantially total internal reflection, as detailed hereinabove with reference to FIGS. 1*a*–*b*. The propagated light, after one or more reflections ("hops") within light-transmissive substrate 34, reaches optical element 36, which couples the trapped light outward from light-transmissive substrate 18, in a direction calculated to reach an eye of a user.

According to a preferred embodiment of the present invention the linear grating pitch, d, of both first 32 and second 36 optical elements are substantially identical, and both gratings are substantially parallel to each other. A skilled artisan would appreciate that with such configuration every light ray, which is incident on optical element 32 at a certain angle, $\alpha_I$, irrespective of the wavelength of the light, will be diffracted off optical element 36 at an angle $\alpha_D$ the absolute value of which substantially equals the absolute value of $\alpha_I$. The relative sign between $\alpha_D$ and $\alpha_I$ is determined from the position and operation mode (transmission mode or reflection mode) of first 32 and second 36 optical elements, according to the following rules.

In the embodiment in which both first 32 and second 36 optical elements are positioned on the same surface of light-transmissive substrate 34, then, if both elements operate in the same mode, i.e. both operate in a transmission mode or both operate in a reflection mode, $\alpha_D=-\alpha_I$, and if first 32 and second 36 optical elements operate in different modes, $\alpha_D=\alpha_I$. On the other hand, in the embodiment in which first 32 and second 36 optical elements are positioned on the different surfaces of light-transmissive substrate 34, the relative sign between the angles is negated. Specifically, if both first 32 and second 36 optical elements operate in the same mode, $\alpha_D=\alpha_I$, and if first 32 and second 36 optical elements operate in different modes, $\alpha_D=-\alpha_I$.

Thus, irrespective of the wavelength of the light, a specific light ray which enters light-transmissive substrate 34 in a given direction exits light-transmissive substrate 34 either in a substantially parallel direction or in a substantially mirrored direction with respect to normal 16. This important feature of the present invention allows maintaining the image viewed at the entire field-of-view, without angular color aberration and/or loss of resolution, except for being mirrored, or horizontally flipped.

As known, angular color aberration and/or loss of resolution, are often caused by a change in the exit angle relative to the entry angle.

As discussed above, the minimal refraction index of light-transmissive substrate 34, $n_{MIN}$, may depend also on $\alpha_D^{MAX}$, the largest angle at which a light ray diffracts off optical element 32. While selecting the value of $\alpha_D^{MAX}$, a variety of embodiments may be considered, e.g., the "at least one hop" embodiment and the "flat" embodiment, as detailed hereinabove. It will be appreciate, however, that in the case of the "at least one hop" embodiment, the predetermined distance, x, is preferably defined between a center of optical element 32 and a center of optical element 36.

Figure 3:
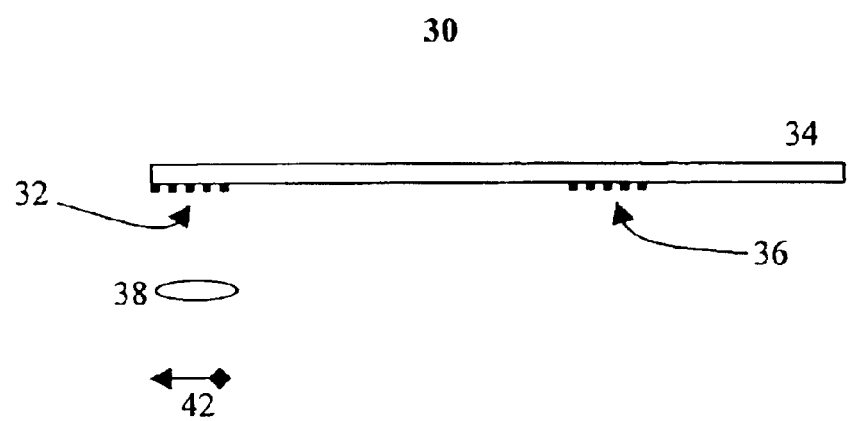
FIG. 3 is a side view of the optical device which further includes a collimator and/or an input light source, according to the present invention.

Reference is now made to FIG. 3, showing a side view of device 30, according to a preferred embodiment of the present invention. Hence, device 30 may further include a collimator 38, and/or an input light source 42. Collimator 38 is positioned in front of light-transmissive substrate 34. Collimator 38 serves for collimating the input light, if it is not already collimated, prior to impinging on light-transmissive substrate 34. Any collimating element known in the art may be used as collimator 38, for example a converging lens or a diffractive optical element. The purpose of the collimating procedure is for improving the imaging ability.

In case of a converging lens, a light ray going through a typical converging lens that is normal to the lens and passes through its center, defines the optical axis. The bundle of rays passing through the lens cluster about this axis and may be well imaged by the lens. Other collimating means, e.g., a diffractive optical element, may also provide imaging functionality, although for such means the optical axis is not well defined. The advantage of a converging lens is due to its symmetry about the optical axis, whereas the advantage of a diffractive optical element is due to its compactness.

In the embodiment in which collimator 38 is a diffractive optical element, it may be spaced apart, carried by or formed in light-transmissive substrate 34. A skilled artisan will appreciate that in the presently preferred embodiment collimator 38 may be positioned either on the entry surface of light-transmissive substrate 34, as a transmissive diffractive element or on the opposite surface of light-transmissive substrate 34 as a reflective diffractive element.

Input light source 42 may reflect or transmit light, impinging light-transmissive substrate 34, thereby the light constitutes an image of input light source 42. Input light source 42 may be in any form known in the art, such as but not limited to, a flat panel display e.g., LCD, an image produced by other optical device, a fiber bundle guiding image information or an array of organic/inorganic light emitting diodes.

Figure 4:
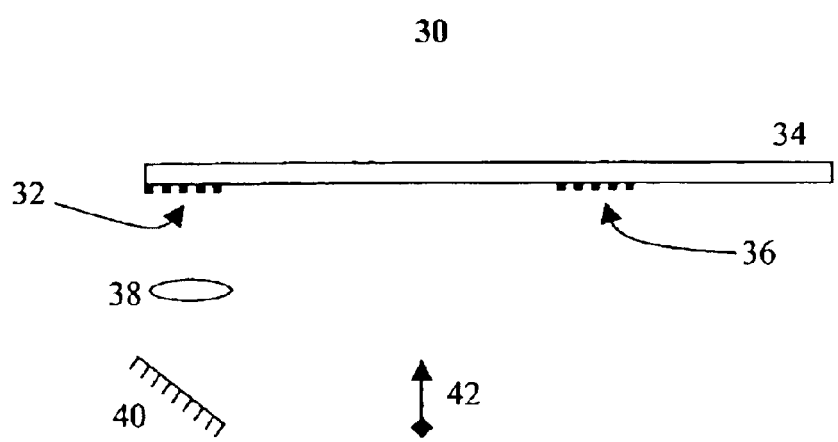
FIG. 4 is a side view of the optical device which further includes at least one optical element for redirecting light rays, according to the present invention.

Reference is now made to FIG. 4, showing a side view of device 30, further including at least one optical element 40 for redirecting light rays. Optical element(s) 40 are positioned so as to reduce an overall size of device 30. Some optical devices function better when light sources are placed within a certain distance therefrom. By including optical element 40, the pathway of the light rays is "folded", hence optical element 40 allows positioning input light source 42 in front of optical element 40, and thus provides control over the cross-sectional size of device 30. According to a preferred embodiment of the present invention optical element 40 may be as simple as a 45 degrees mirror or any other optical element known in the art for redirecting light.

In the preferred embodiment in which the reflected/transmitted light is not already collimated, collimator 38 is positioned between input light source 42 and light-transmissive substrate 34 (FIG. 3), or between optical element 40 and light-transmissive substrate 34 (FIG. 4), depending whether or not optical element 40 is included. In any case collimator 38 should be positioned on the optical path of the light.

The present invention also provides a method of manufacturing a diffractive optical element for optimizing a field-of-view for a multicolor spectrum, such as, for example optical elements 10, 32 and 36.

According to a preferred embodiment of the present invention the method includes determining a linear grating pitch, d, and a minimal index of refraction, $n_{MIN}$, according to the embodiments which have been detailed hereinabove. The method further includes forming a linear grating characterized by the grating pitch, d, in a light-transmissive substrate characterized by an index of refraction, $n_s$, which is larger than $n_{MIN}$, thereby to allow total internal reflection of a light within the light-transmissive substrate.

According to an additional aspect of the invention, certain steps of the above method may be executed more than once so as to provide an optical device such as, e.g., device 30. Specifically, the step of forming a linear grating is executed preferably twice, so that two diffractive optical elements laterally displaced from each other are formed in the light-transmissive substrate.

As stated, the linear gratings may each independently be formed on either faces of the light-transmissive substrate, provided that d and $n_{MIN}$ are determined using consistent signs convention as explained in great details hereinabove.

The linear grating of each of the optical elements can be recorded by means of holographic techniques, by means of computer-generated masks and lithographic techniques, by direct writing techniques, by embossing or etching or by any other procedure known in the art.

It should be understood that the light-transmissive substrate can be manufactured from any material which enables transmission of light therethrough, such as, but not limited to, glass or transparent polymer in the case of visible light. In any case, the index of refraction of the light-transmissive substrate material should be larger than the index of refraction of air, or any other material bounding the light-transmissive substrates.

The preferred technical details of any embodiment of the invention are as follows. The dimensions of the light-transmissive substrate are between about 0.5 mm and about 5 mm in thickness and from about 10 mm to about 100 mm in width/length. A typical width/length of both first and second optical elements ranges for different optical applications such as the near eye display application described in U.S. Pat. No. 5,966,223 from about 5 mm to about 20 mm. The preferred spectrum of light spans at least 300 nm and the preferred field-of-view, which may be either a symmetric or a non symmetric field-of-view, is of at least 10 degrees. More specifically, $\lambda_B$ generally corresponds to a blue light having a typical wavelength of between about 400 to about 500 nm, $\lambda_R$ generally corresponds to a red light having a typical wavelength of between about 600 to about 700 nm and the absolute value of both $\alpha^-_{FOV}$ and $\alpha^+_{FOV}$ is above 5 degrees. In addition, a typical value of grating pitch, d, is between about $0.5\lambda_B$ to about $0.99\lambda_B$.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

Determination of the Grating Pitch

As already stated, the grating pitch, d, depends on the required field-of-view and the wavelength of the light and independent of the index of refraction of the substrate, or any other dimensional parameter of the substrate, and it is conveniently determined from the formula $d=\lambda_B/(1-n_A \sin \alpha^-_{FOV})$. In the following, $n_A$ is taken to be a unity.

For example, if the shortest wavelength in the spectrum corresponds to a blue light, e.g., $\lambda_B=480$ nm, than for a first field-of-view angle of $\alpha^-_{FOV}=-8°$, the grating pitch should be d=421 nm, and for a larger first field-of-view angle of $\alpha^-_{FOV}=-14°$, the grating pitch should be d=386 nm.

Example 2

Determination of the Minimal Refraction Index

The minimal index of refraction can be determined, as detailed above from the formula $n_{MIN}=(\lambda_R/d-n_A \sin \alpha^-_{FOV})/$ $\sin \alpha^{MAX}_D$, where the maximal diffraction angle can be determined according to additional considerations, such as the "flat" embodiment and the "at least one hop" embodiment. Again, $n_A$ is taken to be a unity.

"Flat" Embodiment

According to the "flat" embodiment, it is required that all the diffraction angles would be below a predetermined angle. The present example corresponds to a maximal diffraction angle of 80 degrees.

Hence, if the spectrum ranges from a blue light ($\lambda_B$=480 nm) to a red light ($\lambda_R$=620 nm), than for field-of-view angles of $\alpha^{\pm}_{FOV}$=±14°, the minimal index of refraction is $n_{MIN}$=1.877. An appropriate light-transmissive substrate is, for example a glass type SF 66 purchased from Schott Glas, Germany for which the refractive index is $n_D$=1.923 ($n_D$ is the substrate refractive index at the D wavelength, or 589.3 nm).

On the other hand if only a monochromatic green light is used ($\lambda_G$=540 nm) (green), then for an asymmetric field-of-view of $\alpha^-_{FOV}$=-15° and $\alpha^+_{FOV}$=20°, the required grating pitch is d=429 nm, and the minimal index of refraction is $n_{MIN}$=1.625. An appropriate light-transmissive substrate is a plastic material, for example, HyperIndex 1.67 purchased from Mitsui & Co., Ltd., Japan, for which the refractive index is $n_D$=1.67. Another appropriate light-transmissive substrate is glass type SF2, purchased from Schott Glas, Germany for which the refractive index is $n_D$=1.648.

The "At Least One Hop" Embodiment

According to the "at least one hop" embodiment, $\alpha_D^{MAX}$ is selected so as to allow at least one reflection within a predetermined distance x. The present example corresponds to a predetermined distance of x=55 mm and to a light-transmissive substrate thickness of 2 mm which are typical values in optical devices like device 30. Such geometrical configuration corresponds to $\alpha_D^{MAX}$=85.8 degrees.

Hence, if the spectrum ranges from a blue light ($\lambda_B$=480 nm) to a red light ($\lambda_R$=620 nm), then for field-of-view angles of $\alpha^{\pm}_{FOV}$=±12°, the grating pitch is d=397 nm, and the minimal index of refraction is $n_{MIN}$=1.774. An appropriate light-transmissive substrate is a glass type SF 11, purchased from Schott Glas, Germany, for which the refractive index is $n_D$=1.785.

For smaller field-of-view angles of $\alpha^{\pm}_{FOV}$=±8°, and the same spectral range, the grating pitch should be d=421 nm, and the minimal index of refraction $n_{MIN}$=1.616. Appropriate light-transmissive substrate are the following plastic materials: (a) HyperIndex 1.67 purchased from Mitsui & Co., Ltd., Japan, for which the refractive index is 1.67; (b) HyperIndex 1.74 also purchased from Mitsui & Co., Ltd., Japan, for which the refractive index is 1.74; and (c) Teslalid 1.71 purchased from Hoya Corporation, Japan, for which the refractive index is 1.71. Alternatively an appropriate light-transmissive substrate is the SF2 glass which has already been mentioned above.

For much larger field-of-view angles $\alpha^{\pm}_{FOV}$=±20° and a monochromatic red light ($\lambda_R$=630 nm), the required grating pitch is d=469 nm, and the required minimal refraction index is $n_{MIN}$=1.67, which could be supported by numerous plastics or glass materials, such as those of the above-mentioned materials having a refraction index of at least 1.67.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A diffractive optical element for trapping and propagating a light having a color spectrum characterized by a plurality of wavelengths longer than a shortest wavelength, $\lambda_B$, and shorter than a longest wavelength $\lambda_R$, the light striking the diffractive optical element at an angle greater than a first field-of-view angle, $\alpha^-_{FOV}$, and smaller than a second field-of-view angle, $\alpha^+_{FOV}$, the diffractive optical element comprising a linear grating being formed in a light-transmissive substrate, wherein:

(a) said linear grating is characterized by a pitch, d, selected so as to allow total internal reflection of a first light ray having wavelength of $\lambda_B$ and a striking angle of $\alpha^-_{FOV}$, thereby to trap said first light ray by total internal reflection;

(b) said light-transmissive substrate is characterized by an index of refraction, $n_s$, larger than a minimal index of refraction, $n_{MIN}$, said minimal index of refraction is selected so as to allow total internal reflection of a second light ray having wavelength of $\lambda_R$ and a striking angle of $\alpha^+_{FOV}$, thereby to trap said second light ray by total internal reflection; and (c) a thickness of said light-transmissive substrate is sufficiently large so as to allow propagation of a light of any wavelength longer than $\lambda_B$ and shorter than $\lambda_R$, striking said light-transmissive substrate at any angle larger than $\alpha^-_{FOV}$ and smaller than $\alpha^+_{FOV}$.

2. The diffractive optical element of claim 1, wherein $\lambda_R$ is larger than $\lambda_B$ by at least 30 nm.

3. The diffractive optical element of claim 1, wherein $\alpha^-_{FOV}$ and $\alpha^+_{FOV}$ each independently has an absolute value above 6 degrees with respect to an orientation which is perpendicular to said light-transmissive substrate.

4. The diffractive optical element of claim 1, wherein $\lambda_R$ is larger than $\lambda_B$ by at least 30 nm, and further wherein $\alpha^-_{FOV}$ and $\alpha^+_{FOV}$ each independently has an absolute value above 5 degrees with respect to an orientation which is perpendicular to said light-transmissive substrate.

5. The diffractive optical element of claim 1, wherein said grating pitch, d, is between about $0.5\lambda_B$ to about $0.99\lambda_B$.

6. The diffractive optical element of claim 1, wherein said grating pitch, d, is selected so that a ratio between said $\lambda_B$ and said d has an average value of about 1.5.

7. The diffractive optical element of claim 1, wherein said grating pitch is smaller than or equals $\lambda_B/[n_A(1-\sin \alpha^-_{FOV})]$, where $n_A$ is an index of refraction of an external medium.

8. The diffractive optical element of claim 7, wherein said index of refraction of said external medium is substantially a unity.

9. The diffractive optical element of claim 7, wherein said external medium is air.

10. The diffractive optical element of claim 1, wherein said minimal index of refraction is larger than $\lambda_R/d+n_A \sin(\alpha^+_{FOV})$.

11. The diffractive optical element of claim 1, wherein said total internal reflection is characterized by a predetermined maximal diffraction angle, $\alpha_D^{MAX}$, smaller than 90 degrees with respect to an orientation which is perpendicular to said light-transmissive substrate.

12. The diffractive optical element of claim 1, wherein said total internal reflection is characterized by a predetermined maximal diffraction angle, $\alpha_D^{MAX}$, selected so as to allow at least one reflection within a predetermined distance, x.

13. The diffractive optical element of claim 12, wherein said predetermined distance is 30 mm to 80 mm.

14. The diffractive optical element of claim 11, wherein said minimal index of refraction equals $[\lambda_R/d+\sin(\alpha^+_{FOV})]/\sin(\alpha_D^{MAX})$.

15. The diffractive optical element of claim 12, wherein said minimal index of refraction equals $[\lambda_R/d+\sin(\alpha^+_{FOV})]/\sin(\alpha_D^{MAX})$.

16. The diffractive optical element of claim 1, wherein $\lambda_B$ is between about 400 to about 500 nm.

17. The diffractive optical element of claim 1, wherein $\lambda_R$ is between about 600 to about 700 nm.

18. The diffractive optical element of claim 1, wherein said $n_{MIN}$ is between about 1.6 to about 2.0.

19. The diffractive optical element of claim 1, wherein said light-transmissive substrate is of thickness ranging between about 0.5 mm and about 5 mm.

20. The diffractive optical element of claim 1, wherein said light-transmissive substrate is selected from the group consisting of glass and a transparent polymer.

21. The diffractive optical element of claim 1, wherein said linear diffraction grating is selected from the group consisting of reflection linear diffraction grating and transmission linear diffraction grating.

22. The diffractive optical element of claim 1, wherein said linear diffraction grating is recorded by a procedure selected from a group consisting of holography, computer-generated masks, lithography, embossing, etching and direct writing.

23. An optical device for transmitting a light having a color spectrum characterized by a plurality of wavelengths longer than a shortest wavelength, $\lambda_B$, and shorter than a longest wavelength $\lambda_R$, the light striking the optical device at an angle greater than a first field-of-view angle, $\alpha^-_{FOV}$, and smaller than a second field-of-view angle, $\alpha^+_{FOV}$, the optical device comprising a first diffractive optical element being formed in a light-transmissive substrate, and a second diffractive optical element, laterally displaced from said first diffractive optical element, and being formed in said light-transmissive substrate, wherein:

(a) said first and said second diffractive optical elements are linear gratings characterized by a pitch, d, selected so as to allow total internal reflection of a first light ray having wavelength of $\lambda_B$ and a striking angle of $\alpha^-_{FOV}$, thereby to trap said first light ray by total internal reflection;

(b) said light-transmissive substrate is characterized by an index of refraction, $n_s$, larger than a minimal index of refraction, $n_{MIN}$, said minimal index of refraction is selected so as to allow total internal reflection of a second light ray having wavelength of $\lambda_R$ and a striking angle of $\alpha^+_{FOV}$, thereby to trap said second light ray by total internal reflection; and (c) a thickness of said light-transmissive substrate is sufficiently large so as to allow propagation of a light of any wavelength longer than $\lambda_B$ and shorter than $\lambda_R$, striking said light-transmissive substrate at any angle larger than $\alpha^-_{FOV}$ and smaller than $\alpha^+_{FOV}$.

24. The optical device of claim 23, wherein $\lambda_R$ is larger than $\lambda_B$ by at least 30 nm.

25. The optical device of claim 23, wherein $\alpha^-_{FOV}$ and $\alpha^+_{FOV}$ each independently has an absolute value above 6 degrees with respect to an orientation which is perpendicular to said light-transmissive substrate.

26. The optical device of claim 23, wherein $\lambda_R$ is larger than $\lambda_B$ by at least 30 nm, and further wherein $\alpha^-_{FOV}$ and $\alpha^+_{FOV}$ each independently has an absolute value above 5 degrees with respect to an orientation which is perpendicular to said light-transmissive substrate.

27. The optical device of claim 23, wherein said grating pitch, d, is between about $0.5\lambda_B$ to about $0.99\lambda_B$.

28. The optical device of claim 23, wherein said grating pitch, d, is selected so that a ratio between said $\lambda_B$ and said d has an average value of about 1.5.

29. The optical device of claim 23, wherein said grating pitch is smaller than or equals $\lambda_B/[n_A(1-\sin \alpha^-_{FOV})]$, where $n_A$ is an index of refraction of an external medium.

30. The optical device of claim 29, wherein said index of refraction of said external medium is substantially a unity.

31. The optical device element of claim 29, wherein said external medium is air.

32. The optical device of claim 23, wherein said minimal index of refraction is larger than $\lambda_R/d+n_A \sin(\alpha^+_{FOV})$.

33. The optical device of claim 23, wherein said total internal reflection is characterized by a predetermined maximal diffraction angle, $\alpha_D^{MAX}$, smaller than 90 degrees with respect to an orientation which is perpendicular to said light-transmissive substrate.

34. The optical device of claim 23, wherein said total internal reflection is characterized by a predetermined maximal diffraction angle, $\alpha_D^{MAX}$, selected so as to allow at least one reflection within a predetermined distance, x.

35. The optical device of claim 34, wherein said predetermined distance is 30 mm to 80 mm.

36. The optical device of claim 34, wherein said predetermined distance is defined between a center of said first diffractive optical element and a center of said second diffractive optical element.

37. The optical device of claim 33, wherein said minimal index of refraction equals $[\lambda_R/d+n_A \sin(\alpha^+_{FOV})]/\sin(\alpha_D^{MAX})$.

38. The optical device of claim 34, wherein said minimal index of refraction equals $[\lambda_R/d+n_A \sin(\alpha^+_{FOV})]/\sin(\alpha_D^{MAX})$.

39. The optical device of claim 23, wherein $\lambda_B$ is between about 400 to about 500 nm.

40. The optical device of claim 23, wherein $\lambda_R$ is between about 600 to about 700 nm.

41. The optical device of claim 23, wherein said $n_{MIN}$ is between about 1.6 to about 2.0.

42. The optical device of claim 23, wherein said light-transmissive substrate is of thickness ranging between about 0.5 mm and about 5 mm.

43. The optical device of claim 23, wherein said light-transmissive substrate is selected from the group consisting of glass and a transparent polymer.

44. The optical device of claim 23, wherein said linear diffraction grating of said first diffractive optical element is substantially parallel to said linear diffraction grating of said second diffractive optical element.

45. The optical device of claim 23, wherein said linear diffraction gratings of said first and second diffractive optical elements are each independently selected from the group consisting of reflection linear diffraction gratings and transmission linear diffraction gratings.

46. The optical device of claim 23, wherein said linear diffraction gratings of said first and said second diffractive optical elements are each independently formed on a surface selected from the group consisting of a first surface of said light-transmissive substrate and a second surface of said light-transmissive substrate.

47. The optical device of claim 23, further comprising an input light source for producing said light.

48. The optical device of claim 47, wherein said input light source comprises an input display source, hence said light constitutes an image.

49. The optical device of claim 47, further comprising a collimator for collimating said light produced by said input light source.

50. The optical device of claim 49, wherein said collimator comprises a converging lens.

51. The optical device of claim 49, wherein said collimator comprises a diffractive optical element.

52. The optical device of claim 23, further comprising at least one optical element for redirecting light rays, positioned so as to reduce an overall size of the optical device.

53. The optical device of claim 52, wherein said at least one optical element is a 45 degrees mirror.

54. The optical device of claim 23, wherein said linear diffraction gratings are recorded by a procedure selected from a group consisting of holography, computer-generated masks, lithography, embossing, etching and direct writing.

55. A method of manufacturing a diffractive optical element for trapping and propagating a light having a color spectrum characterized by a plurality of wavelengths longer than a shortest wavelength, $\lambda_B$, and shorter than a longest wavelength $\lambda_R$, the light striking the diffractive optical element at an angle greater than a first field-of-view angle, $\alpha^-_{FOV}$, and smaller than a second field-of-view angle, $\alpha_{+FOV}$, the method comprising:

(a) determining a linear grating pitch, d, so as to allow total internal reflection of a first light ray having wavelength of $\lambda_B$ and a striking angle of $\alpha^-_{FOV}$, thereby to trap said first light ray by total internal reflection;

(b) determining a minimal index of refraction, $n_{MIN}$, so as to allow total internal reflection of a second light ray having wavelength of $\lambda_R$ and a striking angle of $\alpha^+_{FOV}$, thereby to trap said second light ray by total internal reflection; and (c) forming a linear grating characterized by said grating pitch, d, in a light-transmissive substrate characterized by an index of refraction, $n_s$, wherein said $n_s$ being larger than said $n_{MIN}$, wherein a thickness of said light-transmissive substrate is selected sufficiently large so as to allow propagation of a light of any wavelength longer than $\lambda_B$ and shorter and $\lambda_R$, striking said light-transmissive substrate at any angle larger than $\alpha^-_{FOV}$ and smaller than $\alpha^+_{FOV}$.

56. The method of claim 55, wherein $\lambda_R$ is larger than $\lambda_B$ by at least 30 nm.

57. The method of claim 55, wherein $\alpha^-_{FOV}$ and $\alpha^+_{FOV}$ each independently has an absolute value above 6 degrees with respect to an orientation which is perpendicular to said light-transmissive substrate.

58. The method of claim 55, wherein $\lambda_R$ is larger than $\lambda_B$ by at least 30 nm, and further wherein $\alpha^-_{FOV}$ and $\alpha^+_{FOV}$ each independently has an absolute value above 5 degrees with respect to an orientation which is perpendicular to said light-transmissive substrate.

59. The method of claim 55, wherein said determining said grating pitch, d, is done so that said d is between about $0.5\lambda_B$ to about $0.99\lambda_B$.

60. The method of claim 55, wherein said determining said grating pitch, d, is done so that a ratio between said $\lambda_B$ and said d has an average value of about 1.5.

61. The method of claim 55, wherein said determining said grating pitch, d, is done so that said d is smaller than or equals $\lambda_B/[n_A(1-\sin \alpha^-_{FOV})]$, where $n_A$ is an index of refraction of an external medium.

62. The method of claim 61, wherein said index of refraction of said external medium is substantially a unity.

63. The method element of claim 61, wherein said external medium is air.

64. The method of claim 55, wherein said determining said minimal index of refraction, $n_{MIN}$, is done so that said $n_{MIN}$ is larger than $\lambda_R/d + n_A \sin(\alpha^+_{FOV})$.

65. The method of claim 55, further comprising selecting a maximal diffraction angle, $\alpha_D^{MAX}$.

66. The method of claim 65, wherein said total internal reflection is characterized by said maximal diffraction angle.

67. The method of claim 65, wherein said $\alpha_D^{MAX}$ is smaller than 90 degrees with respect to an orientation which is perpendicular to said light-transmissive substrate.

68. The method of claim 65, wherein said selecting a maximal diffraction angle is by calculating an angle corresponding to at least one reflection within a predetermined distance, x.

69. The method of claim 68, wherein said predetermined distance is 30 mm to 80 mm.

70. The method of claim 67, wherein said determining said minimal index of refraction, $n_{MIN}$, is done so that said $n_{MIN}$ equals $[\lambda_R/d + n_A \sin(\alpha^+_{FOV})]/\sin(\alpha_D^{MAX})$.

71. The method of claim 68, wherein said determining said minimal index of refraction, $n_{MIN}$, is done so that said $n_{MIN}$ equals $[\lambda_R/d + n_A \sin(\alpha^+_{FOV})]/\sin(\alpha_D^{MAX})$.

72. The method of claim 55, wherein said $\lambda_B$ is between about 400 to about 500 nm.

73. The method of claim 55, wherein said $\lambda_R$ is between about 600 to about 700 nm.

74. The method of claim 55, wherein said $n_{MIN}$ is between about 1.6 to about 2.0.

75. The method of claim 55, wherein said light-transmissive substrate is of thickness ranging between about 0.5 mm and about 5 mm.

76. The method of claim 55, wherein said light-transmissive substrate is selected from the group consisting of glass and a transparent polymer.

77. The method of claim 55, wherein said linear diffraction grating is selected from the group consisting of reflection linear diffraction grating and transmission linear diffraction grating.

78. The method of claim 55, wherein said linear diffraction grating is recorded by a procedure selected from a group consisting of holography, computer-generated masks, lithography, embossing, etching and direct writing.

79. A method of manufacturing an optical device for transmitting a light having a color spectrum characterized by a plurality of wavelengths longer than a shortest wavelength, $\lambda_B$ and shorter than a longest wavelength $\lambda_R$, the light striking the optical device at an angle greater than a first field-of-view angle, $\alpha^-_{FOV}$, and smaller than a second field-of-view angle, $\alpha^+_{FOV}$, the method comprising:

(a) determining a linear grating pitch, d, so as to allow total internal reflection of a first light ray having wavelength of $\lambda_B$ and a striking angle of $\alpha^-_{FOV}$ thereby to trap said first light ray by total internal refection;

(b) determining a minimal index of refraction, $n_{MIN}$, so as to allow total internal reflection of a second light ray having wavelength of $\lambda_R$ and a striking angle of $\alpha^+_{FOV}$, thereby to trap said second light ray by total internal reflection; and (c) positioning a light-transmissive substrate and forming therein a first diffractive optical element and a second diffractive optical element laterally displaced from said first diffractive optical element;

wherein said first and said second diffractive optical elements are linear gratings characterized by said grating pitch, d, and said light-transmissive substrate is characterized by an index of refraction, $n_s$, which is larger than said $n_{MIN}$, and further, wherein a thickness of said light-transmissive substrate is selected sufficiently large so as to allow propagation of a light of any wavelength longer than $\lambda_B$ and shorter than $\lambda_R$, striking said light-transmissive substrate at any angle larger than $\alpha^-_{FOV}$ and smaller than $\alpha^+_{FOV}$.

80. The method of claim 79, wherein $\lambda_R$ is larger than $\lambda_B$ by at least 30 nm.

81. The method of claim 79, wherein $\alpha^-_{FOV}$ and $\alpha^+_{FOV}$ each independently has an absolute value above 6 degrees with respect to an orientation which is perpendicular to said light-transmissive substrate.

82. The method of claim 79, wherein $\lambda_R$ is larger than $\lambda_B$ by at least 30 nm, and further wherein $\alpha^-_{FOV}$ and $\alpha^+_{FOV}$ each independently has an absolute value above 5 degrees with respect to an orientation which is perpendicular to said light-transmissive substrate.

83. The method of claim 79, wherein said determining said grating pitch, d, is done so that said d is between about $0.5\lambda_B$ to about $0.99\lambda_B$.

84. The method of claim 79, wherein said determining said grating pitch, d, is done so that a ratio between said $\lambda_B$ and said d has an average value of about 1.5.

85. The method of claim 79, wherein said determining said grating pitch is done so that said d is smaller than or equals $\lambda_B/[n_A(1-\sin \alpha^-_{FOV})]$, where $n_A$ is an index of refraction of an external medium.

86. The method of claim 85, wherein said index of refraction of said external medium is substantially a unity.

87. The method element of claim 85, wherein said external medium is air.

88. The method of claim 79, wherein said determining said minimal index of refraction, $n_{MIN}$, is done so that said $n_{MIN}$ is larger than $\lambda_R/d+n_A \sin(\alpha^+_{FOV})$.

89. The method of claim 79, further comprising selecting a maximal diffraction angle, $\alpha_D^{MAX}$.

90. The method of claim 89, wherein said total internal reflection is characterized by said maximal diffraction angle.

91. The method of claim 89, wherein said $\alpha_D^{MAX}$ is smaller than 90 degrees with respect to an orientation which is perpendicular to said light-transmissive substrate.

92. The method of claim 89, wherein said selecting a maximal diffraction angle is by calculating an angle corresponding to at least one reflection within a predetermined distance, x.

93. The method of claim 92, wherein said predetermined distance is 30 mm to 80 mm.

94. The method of claim 92, wherein said predetermined distance is defined between a center of said first diffractive optical element and a center of said second diffractive optical element.

95. The method of claim 90, wherein said determining said minimal index of refraction, $n_{MIN}$, is done so that said $n_{MIN}$ equals $[\lambda_R/d+n_A \sin(\alpha^+_{FOV})]/\sin(\alpha_D^{MAX})$.

96. The method of claim 92, wherein said determining said minimal index of refraction, $n_{MIN}$, is done so that said $n_{MIN}$ equals $[\lambda_R/d+n_A \sin(\alpha^+_{FOV})]/\sin(\alpha_D^{MAX})$.

97. The method of claim 79, wherein $\lambda_B$ is between about 400 to about 500 nm.

98. The method of claim 79, wherein $\lambda_R$ is between about 600 to about 700 nm.

99. The method of claim 79, wherein said $n_{MIN}$ is between about 1.6 to about 2.0.

100. The method of claim 79, wherein said light-transmissive substrate is of thickness ranging between about 0.5 mm and about 5 mm.

101. The method of claim 79, wherein said light-transmissive substrate is selected from the group consisting of glass and a transparent polymer.

102. The method of claim 79, wherein said linear diffraction grating of said first diffractive optical element is substantially parallel to said linear diffraction grating of said second diffractive optical element.

103. The method of claim 79, wherein said linear diffraction gratings of said first and second diffractive optical elements are each independently selected from the group consisting of reflection linear diffraction gratings and transmission linear diffraction gratings.

104. The method of claim 79, wherein said linear diffraction gratings of said first and said second diffractive optical elements are each independently formed on a surface selected from the group consisting of a first surface of said light-transmissive substrate and a second surface of said light-transmissive substrate.

105. The method of claim 79, further comprising positioning an input light source for producing said light.

106. The method of claim 105, wherein said input light source comprises an input display source, hence said light constitutes an image.

107. The method of claim 105, further comprising positioning a collimator for collimating said light produced by said input light source.

108. The method of claim 107, wherein said collimator comprises a converging lens.

109. The method of claim 107, wherein said collimator comprises a diffractive optical element.

110. The method of claim 79, further comprising positioning at least one optical element for redirecting light rays, positioned so as to reduce an overall size of the optical device.

111. The method of claim 110, wherein said at least one optical element is a 45 degrees mirror.

112. The method of claim 79, wherein said linear diffraction gratings are recorded by a procedure selected from a group consisting of holography, computer-generated masks, lithography, embossing, etching and direct writing.

* * * * *